United States Patent [19]

Baur et al.

[11] Patent Number: 4,492,676
[45] Date of Patent: Jan. 8, 1985

[54] PROCESS FOR PREVENTING THE PLUGGING OF INSTALLATIONS WITH METALLIC SULFIDES

[75] Inventors: Karl Baur, Baierbrunn; Heinz Karwat, Pullach, both of Fed. Rep. of Germany

[73] Assignee: Linde Aktiengesellschaft, Wiesbaden, Fed. Rep. of Germany

[21] Appl. No.: 580,598

[22] Filed: Feb. 16, 1984

[30] Foreign Application Priority Data

Mar. 9, 1983 [DE] Fed. Rep. of Germany ....... 3308392

[51] Int. Cl.$^3$ ............................................. B01D 53/34
[52] U.S. Cl. ................................... 423/210; 423/226; 55/68; 55/73
[58] Field of Search ............... 423/210 M, 226; 55/68, 55/73

[56] References Cited

U.S. PATENT DOCUMENTS 4,144,314 3/1979 Doerges et al. ..................... 423/210
4,250,150 2/1981 Karwat et al. ....................... 423/226

*Primary Examiner*—Earl C. Thomas
*Attorney, Agent, or Firm*—Millen & White

[57] ABSTRACT

For preventing the fouling and/or plugging of apparatus with metallic sulfides in the processing and purification of synthesis gases contaminated with metal carbonyls, wherein the synthesis gases are scrubbed with a physical solvent, which solvent is regenerated and reused, an organic phosphite, e.g., trimethyl phosphite, and/or an organic phosphine, e.g., triethyl phosphine or triphenyl phosphine, is added as a complexing agent to the scrubbing media, preferably in between the scrubbing and absorption regenerating steps.

20 Claims, 1 Drawing Figure

U.S. Patent  Jan. 8, 1985  4,492,676
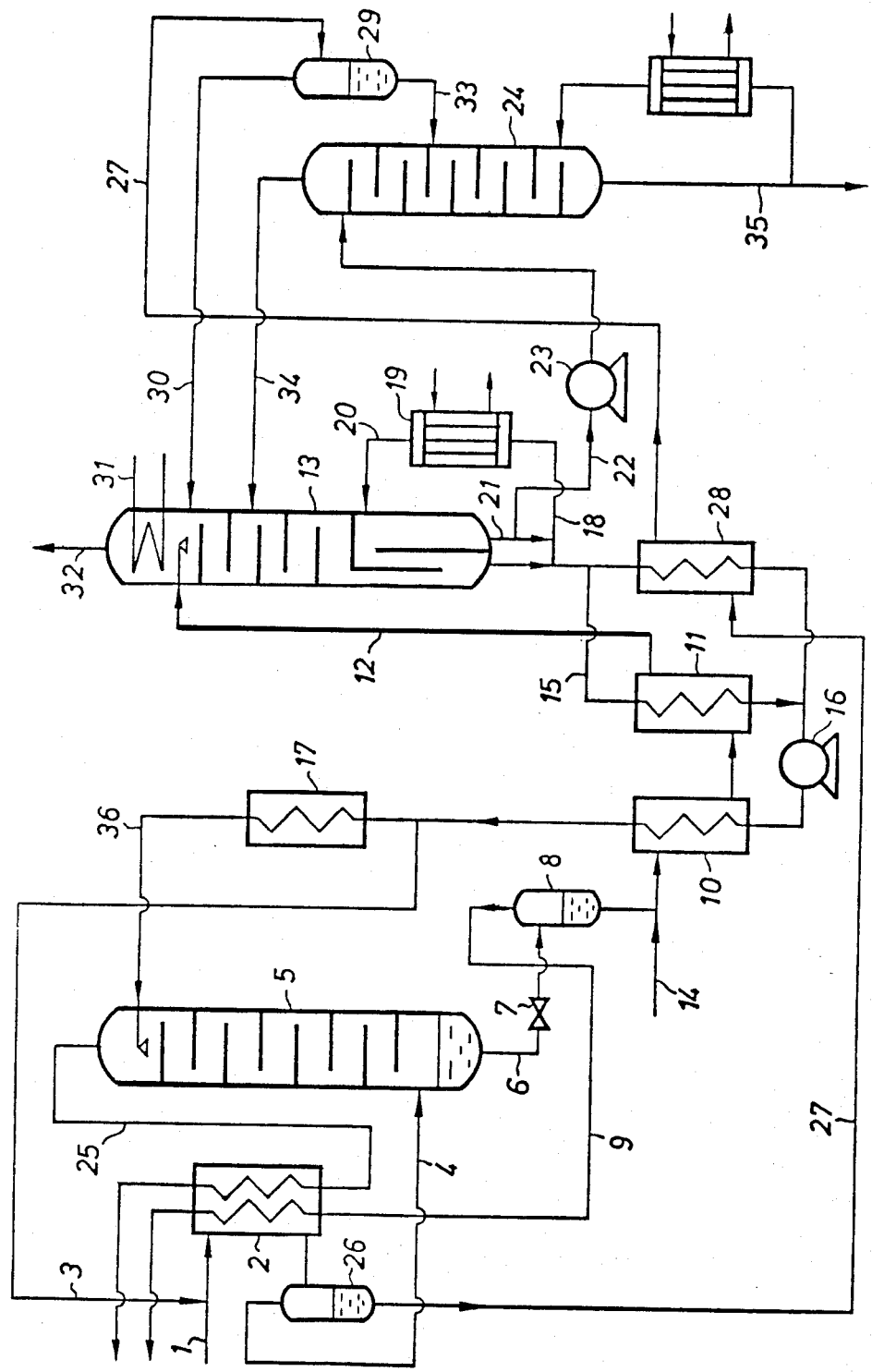

PROCESS FOR PREVENTING THE PLUGGING OF INSTALLATIONS WITH METALLIC SULFIDES

BACKGROUND OF THE INVENTION

This invention relates to an improvement in a gas absorption process, in particular, a process wherein synthesis gases are scrubbed with a regenerable physical solvent to remove carbon dioxide, hydrogen sulfide, and metal carbonyls, and wherein metallic sulfide deposits foul, plug or clog the involved apparatus.

It is well known that apparatuses are fouled by metallic sulfides formed during the processing of synthesis gases produced by gasification of solid or liquid fuels with steam and oxygen under pressure and elevated temperatures, which gases are further refined into $H_2$—CO-synthesis gases. As has been previously determined, the fouling problem is caused by metal carbonyls contained in the synthesis gases and which tend to form sulfides with the sulfur compounds also present therein. These metallic sulfides are deposited on parts of the apparatus, such as heat exchangers or the regenerating column, resulting in a reduction in efficiency of each apparatus and the eventual plugging of same.

To avoid such plugging, it is taught in U.S. Pat. No. 4,144,314 issued March 13, 1979 to Doerges et al to add to the solvent certain complex-forming agents in a concentration of 0.005–1 g/l, said complexing agent being ethylenediaminetetraacetic acid, nitriloacetic acid, organic phosphonic acids and/or their derivatives, or their dissolved ammonium compounds. However, this technique has proven to exhibit less than the desired effectiveness for the elimination of plugging.

SUMMARY OF THE INVENTION

An object of the present invention, therefore, is to provide an improved process of the type discussed above, preventing the formation of metallic sulfides in a simple and efficient way.

Upon further study of the specification and appended claims, further objects and advantages of this invention will become apparent to those skilled in the art.

To attain these objects, more effective complexing agents are added to the solvent, said complexing agents being organic phosphites or phosphines.

By the metered feeding of organic phosphites of the chemical formula $P(OR)_3$ or phosphines of the chemical formula $PR_3$, wherein R represents an organic group, the metal carbonyl component in the physical solvent, e.g., nickel carbonyl, is reacted in accordance with the following equations:

$$Ni(CO)_4 + xP(OR)_3 \rightarrow Ni(CO)_{4-x}[P(OR)_3]_x + xCO$$
$$(x=1,2,3,4)$$

$$Ni(CO)_4 + xPR_3 \rightarrow Ni(CO)_{4-x}[PR_3]_x + xCO$$
$$(x=1,2,3,4).$$

Some of the resultant nickel complexes are known per se, see Kirk-Othmer, "Encyclopedia of Chemical Technology", 3rd edition, Vol. 15, p 807, Wiley N.Y., 1981 and "Gmelins Handbuch der Anorganischen Chemie," 57, p. 830 Ni(B), Verlag Chemie, Weinheim/Bergstrasse, 1966.

Corresponding reactions also occur, for example with Group VIII metals, e.g., iron and cobalt carbonyls, all of which are contemplated by the present invention.

The substitution of one or several carbonyl CO-groups by phosphines or phophites leads to thermally stable compounds. During heating and regeneration of the carbonyl-containing solvent, metallic sulfides do not appear either as a coating or as a colloidal precipitate. The organic R groups can be any group that does not interfere with the above reactions. The preferred R groups are alkyl or aryl, especially alkyl of 1–3 carbon, and aryl of 6–8 carbon atoms. More preferably employed are trimethyl phosphite, triethyl phosphine and/or triphenylphosphine. These trialkyl or triaryl phosphites and phosphines exhibit vapor pressures so low that they do not contaminate the gas, (i.e., a vapor pressure of considerably less than the vapor pressure of the physical solvent) and they are readily soluble in the physical solvent, just as the thus-formed metal carbonyl derivatives. Where $H_2O$-containing synthesis gas is treated, and where the solvent, after the purification of the gas, is at least partially separated from the water after regeneration, it is advantageous for the metal carbonyl derivatives to be removed from the facility together with the separated water during the solvent-water separation step.

Frequently, HCN and $NH_3$ are also encountered in synthesis gases. However, these compounds have no deleterious effect on complex formation.

In some cases, it may be necessary to remove the thus formed metal carbonyl derivatives from the water separated from the solvent, especially the relatively toxic nickel carbonyl derivative. This can be accomplished by adsorption on carbon, or by hydrolysis or oxidation of the complexing agent followed by precipitation of the metal.

As can be seen from the above set forth equations, at least one mole of the complexing agent is required per mole of metal for the reaction. However, preferably an excess of complexing agents is employed, especially 2–4 moles of complexing agents per mole of metal carbonyl.

The process of this invention can be utilized with all physical solvents, such as, for example, with alcohols, especially methanol or ethanol alone, or in combination with, for example, toluene, N-methylpyrrolidone, polyethylene glycol ethers, dimethylformamide, or glycol.

BRIEF DESCRIPTION OF FIGURE

The attached FIGURE is a schematically illustrated preferred comprehensive embodiment of the invention.

DETAILED DESCRIPTION OF FIGURE

At 1, 100,000 $Nm^3/h$ of a typical synthesis gas having a temperature of about 30° C. and a pressure of 70 bar is fed into a precooler 2. The synthesis gas is comprised primarily of $H_2$ and CO, and also contains $CO_2$, $H_2S$, 80 kg/h of water, as well as 0.56 vppm (volumetric parts per million) of nickel carbonyl (=2.5 g mol/h). In precooler 2, the $H_2O$-saturated gas is cooled to about $-20°$ C. in indirect heat exchange relationship with gaseous fractions returning from the scrubbing stage via conduits 25 and 9, as will be elucidated more explicitly below. In order to prevent the apparatus from being plugged with frozen water, methanol, functioning as anti-freeze, is injected into precooler 2 via conduit 3. The thus-precooled synthesis gas passes via a phase separator 26 and counduit 4 into a methanol scrubbing column 5 for the absorption of acidic components $CO_2$ (in part) and $H_2S$ as well as nickel carbonyl. In the scrubbing column 5, cold methanol is introduced to the top of the column via conduit 36 at about $-45°$ C. The methanol is then warmed as it is passed downwardly through the scrubbing column to the base of the column where it reaches a temperature of $-8°$ C., the heat being supplied primarily by the heat of solution of the gas. The thus-purified gas is discharged via conduit 25 to precooler 2 and then to further treatment.

The methanol, loaded with the absorbed gases, is conducted via conduit 6 and an expansion valve 7 to a phase separator 8 where most of the concomitantly dissolved $H_2$ and CO is separated at 25 bar from the methanol scrubbing medium. The thus-expanded gas containing $H_2$ and CO is recycled into the crude gas stream 1 via conduit 9 and precooler 2 and a recycle compressor, not shown herein. The scrubbing medium with dissolved $CO_2$, $H_2S$, and nickel carbonyl is heated in heat exchanger 10 to about ambient temperature and then in heat exchanger 11 to about $90°$ C., from which it is passed via conduit 12 to the regenerating column 13.

In the regeneration column 13, heating and regeneration of the scrubbing medium is conducted under a pressure of generally about 1.5-10 bar, preferably about 4 bar at generally about $73°-138°$ C., preferably about $100°$ C. Without any counter measures, nickel carbonyl would be decomposed and would react with the accompanying $H_2S$ to form nickel sulfide, which would then form a coating firmly adhering to the surfaces of the apparatus. This coating would, in the course of time, impair the efficiency of the facility and finally would result in shut down of the facility because of plugging.

The prevent this from occuring, 248 g/h of trimethyl phosphite (5 g mol/h) is added to the methanol via conduit 14 before the heating step, the phosphite functioning as complexing agent in accordance with this invention. To facilitate the introduction of this small quantity of phosphite with a commercially available metering pump, the phosphite is first diluted to a concentration of about 25 g trimethyl phosphate per liter of methanol. In accordance with the above-described reaction equation, nickel carbonyl derivatives are formed with the nickel carbonyl, said derivatives being unreactive with $H_2S$ and being also readily soluble in methanol.

The scrubbing medium collecting in the sump of regeneration column 13 is at this point free of $CO_2$ and $H_2S$ and contains nickel in the form of a dissolved carbonyl derivative.

The major protion of the scrubbing medium is withdrawn from the column via conduit 15, then cooled to about ambient temperature in heat exchanger 11, and is finally recycled to scrubbing column 5 via pump 16, heat exchanger 10 and cooler 17.

In order to generate the methanol vapor which in effect strips out residual gases from the scrubbing medium, the necessary amount of methanol is fed via conduit 18 to an evaporator 19 heated with low-pressure steam. A mixture of vapor-phase and liquid methanol passes from the evaporator via conduit 20 into column 13. The liquid proportion—enriched with components having a low vapor pressure, among these the nickel carbonly derivatives—is mostly recirculated via conduit 21 into the evaporator. A smaller proportion thereof—enough for making up the reflux of the column 24—, is passed via conduit 22 and pump 23 into the water-methanol fractionating column 24.

Referring back again to the beginning of the process, a mixutre of methanol and water in which some synthesis gases are dissolved is accumulated in phase separator 26. This mixture is passed via conduit 27 into heater 28 wherein it is heated to a temperature of about $20°-80°$ C. by a partial stream of the regenerated methanol withdrawn from the column. The primary quantity of previously dissolved gases is separated from the mixture in phase separator 29. The gases are conducted via conduit 30 into the head of column 13 and finally leave the facility, together with the $CO_2$ and $H_2S$ driven out in column 13, by way of water-cooled heat exchange means 31 and conduit 32. The remaining liquid mixture in separator 29 is introduced via conduit 33 into fractionating column 24 wherein methanol is withdrawn overhead and passed to column 13 via conduit 34 and is withdrawn from the sump via conduit 35.

The nickel carbonyl derivatives are enriched in the methanol recirculated in the scrubbing stage until the quantities of nickel carbonyl derivatives passing with the reflux via conduit 22 and with the feed water-methanol mixture via conduit 33 into column 24 correspond to the feed of nickel carbonyl in the synthesis gas.

In column 24, the nickel carbonyl derivatives, owing to their low volatility, are discharged in a controlled manner under partial hydrolysis together with the water.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the innvention to adapt it to various usages and conditions.

What is claimed is:

1. In a gas absorption process for the removal of carbon dioxide, hydrogen sulfide, and metal carbonyls from a synthesis gas, comprising scrubbing said synthesis gases with a physical solvent, regenerating resultant physical solvent and reusing resultant regenerated solvent in the scrubbing step, the improvement comprising adding to the solvent an organic phosphite or phosphine as a complexing agent for the metals in said metal carbonyls, thereby inhibiting the formation of metal sulfides which would otherwise foul parts of apparatus used in the process.

2. A process according to claim 1, comprising adding, per mole of metal carbonyl, at least 1 mole of complexing agent.

3. A process according to claim 1, comprising adding, per mole of metal carbonyl, 2-4 moles of complexing agent.

4. A process according to claim 1 wherein the synthesis gas contains $H_2O$ absorbable in the physical solvent, and after the physical solvent is regenerated, the absorber water is at least partially separated from the physical solvent, the thus-formed complexes being transferred to the water phase separated from the physical solvent.

5. A process according to claim 1 wherein said organic phosphite or phosphine comprises a trialkyl phosphite or triaryl phosphite.

6. A process according to claim 5 wherein trimethyl phosphite is employed as a complexing agent.

7. A process according to claim 1 wherein said organic phosphite or phosphine comprises a trialkyl phosphine or triaryl phosphine.

8. A process according to claim 7 wherein triethyl phosphine or triphenylphosphine is employed as a complexing agent.

9. A process according to claim 1 wherein said physical solvent is methanol.

10. A process according to claim 6 wherein said physical solvent is methanol.

11. A process according to claim 1 wherein said regenerating is conducted at about 100° C.

12. A process according to claim 6 wherein said regenerating is conducted at about 100° C.

13. A process according to claim 7 wherein said regenerating is conducted at about 100° C.

14. A process according to claim 10 wherein said regenerating is conducted at about 100° C.

15. A process according to claim 14 wherein the addition of the complexing agent is conducted downstream of the scrubbing step and upstream of the regeneration step.

16. A process according to claim 15 further comprising a step downstream of the scrubbing step and upstream of the addition step of depressurizing the solvent to remove $H_2$ and CO therefrom.

17. A process according to claim 1 further comprising a step downstream of the scrubbing step and upstream of the addition step of depressurzing the solvent to remove $H_2$ and CO therefrom.

18. A process according to claim 1, wherein the scrubbing step is conducted at below ambient temperature and the complexing agent is added to cold solvent recovered from the scrubbing step before said cold solvent is heated to ambient temperature.

19. A process according to claim 10, wherein the scrubbing step is conducted at below ambient temperature and the complexing agent is added to cold solvent recovered from the scrubbing step before said cold solvent is heated to ambient temperature.

20. A process acording to claim 15, wherein the scrubbing step is conducted at below ambient temperature and the complexing agent is added to cold solvent recovered from the scrubbing step before said cold solvent is heated to ambient temperature.

* * * * *